United States Patent [19]

Nagasaki

[11] Patent Number: 4,737,842
[45] Date of Patent: Apr. 12, 1988

[54] COLOR EMPHASIS CIRCUIT
[75] Inventor: Tatsuo Nagasaki, Tokyo, Japan
[73] Assignee: Olympus Optical Co., Ltd., Tokyo, Japan
[21] Appl. No.: 936,281
[22] Filed: Dec. 1, 1986
[30] Foreign Application Priority Data
Nov. 30, 1985 [JP] Japan .................................. 60-270559
[51] Int. Cl.⁴ ............................................. H04N 9/535
[52] U.S. Cl. ............................................ 358/27; 358/98
[58] Field of Search .................... 358/27, 28, 98, 21 R, 358/23, 29

[56] References Cited
U.S. PATENT DOCUMENTS
4,498,097 2/1985 Fujimoto ........................... 358/27 X
4,622,584 11/1986 Nagasaki et al. ....................... 358/98

Primary Examiner—Howard W. Britton
Assistant Examiner—Victor R. Kostak
Attorney, Agent, or Firm—Armstrong, Nikaido, Marmelstein & Kubovcik

[57] ABSTRACT

A color emphasis circuit in a color endoscope includes a color signal modulator for modulating color signals corresponding to a color image, a color signal averager for obtaining an averaged value by averaging the color signals for every color image, an averaged color signal modulator for modulating the averaged color signals, and a hue difference detector for detecting a hue difference between the modulated color signal output from said color signal modulator and the modulated averaged color signal output from said averaged color signal modulator. Further, a hue difference changer is provided for widening the detected hue difference at least near the averaged value so as to change the hue difference. A phase shifter is also provided for shifting phases of the modulated color signals by the changed hue difference; additionally, a demodulator is provided for demodulating the phase shifted modulated color signals to output color emphasized color signals for display.

12 Claims, 6 Drawing Sheets

DELAYED QUANTITY

FIG.9

SAMPLE-HOLD PULSE

COLOR EMPHASIS CIRCUIT

FIELD OF THE INVENTION AND RELATED ART STATEMENT

The present invention relates to a color emphasis circuit for changing color contrast in a display picture at real time without changing the picture luminance.

Recently, there have widely been used endoscopes for diagnosing an affected part in a somatic cavity by inserting a long and narrow insertion section thereof into the cavity without incision or for medically treating the affected part by inserting a treating instrument through the insertion section where necessary. In the above endoscope, an image of an objective position such as an affected part is formed through an image formation lens disposed at one end of the insertion section; and an optical image thus formed is transmitted to near at hand through optical image transmitting means such as a find-bundle so as to be magnified and observed through an optical eyepiece system.

In the endoscope field, however, an electronic endoscope (referred to as electronic scope hereinafter) will widely be used in the future, because an image can readily be recorded and/or reproduced. In the electronic scope, an optical image can be formed on image surfaces of solid-state image sensing elements such as a CCD via an image formation lens, and electric video signals photoelectrically transduced through the solid-state image elements can be displayed as a monitor picture without use of the conventional optical image transmitting means.

Figure 1:
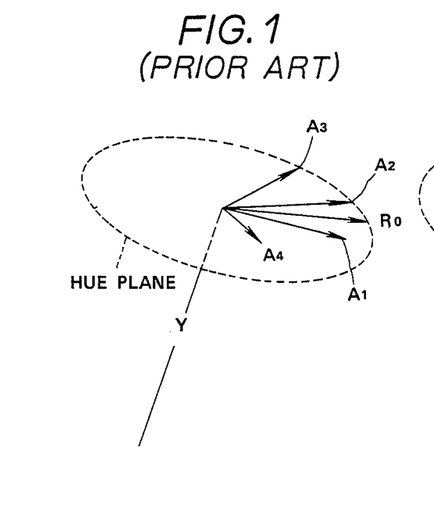
FIG. 1 is a diagram for assistance in explaining that hue concentrates near red in a monitor picture of the conventional electronic scope.

In an image such as an affected part in the somatic cavity obtained by the above electronic scope, the major parts of color vectors $A_i(i=1, 2, 3 \ldots)$ of the picture elements concentrate near the red color vector $R_0$, on the assumption that each picture element is expressed as the sum of color vectors $A_i$ varying in a hue plane prescribed by a luminance signal vector Y as depicted by a notional view in FIG. 1.

Where the color vectors $A_i$ concentrate near red, it is difficult to distinguish a normal pink mucous membrance from a congested ulcer for diagnosis in dependence upon the monitor picture displayed by the electronic scope. Therefore, in the prior-art electronic scope there exists problem in that he greatest care must be taken of a delicate hue change on the monitor picture, thus a burden is cast upon the diagnostician. In addition, since the hue change is small in the early disease stage, there exists a problem such that an effected part is overlooked, in spite of the fact that a cancer should be find out at the early stage.

To overcome the above problem, conventionally the color has been corrected by simply emphasizing a specific color or by changing hue throughout the monitor picture. Therefore, the luminace also changes, so that a familiar color tone of the affected part changes to another color. As a result, in the conventional method, it is impossible to make the best use of the long diagnosis experience of diagnosticians.

OBJECT AND SUMMARY OF THE INVENTION

The object of the present invention is to provide a color emphasis circuit which can widen color contrast or color dynamic range without changing the luminace on a monitor picture obtained through an electronic scope.

Another object of the present invention is to provide a color emphasis circuit which can provided a color picture easy to diagnose by emphasizing a delicate color change.

The other object of the present invention is to provide a color emphasis circuit which can change color contrast at real time.

The color emphasis circuit according to the present invention comprises an averaging circuit for obtaining an averaged value of color signals on a picture based upon color video signals; a hue difference detecting circuit for detecting a hue difference betweeen the averaged value and color signals of a predetermined unit on each picture; a hue difference changing circuit for emphasizing the hue difference value near the averaged value of the color signals; and color emphasizing circuit for shifting the color signal phase of each unit by a value corresponding to the emphasized hue difference. According to the present invention, the color dynamic range is widened so that diagnosis can be facilitated at picture positions having color near the averaged color, almost without changing the luminance or the averaged color on the picture.

DETAILED DESCRIPTION OF THE PREFERRED EMBODIMENTS

Figure 2:
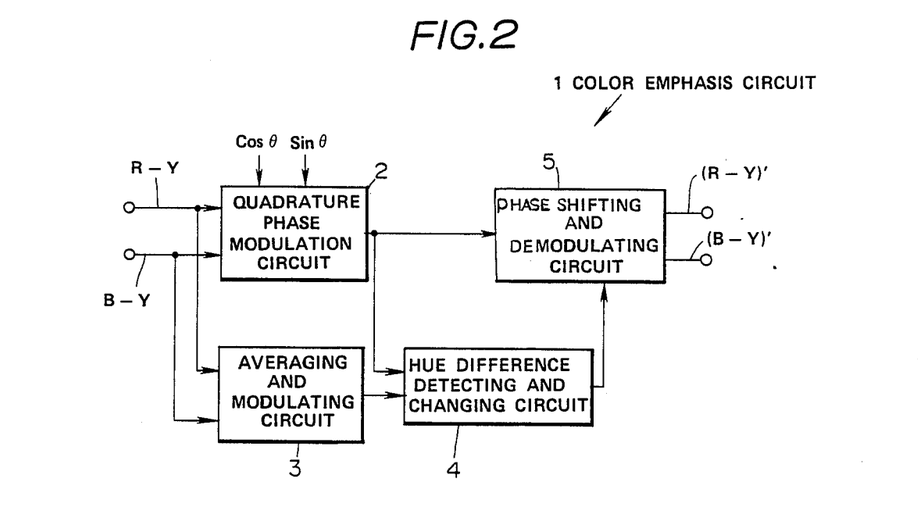
FIG. 2 is a schematic block diagram of the circuit configuration of the first embodiment.

The first embodiment of a color emphasis circuit 1 is configured as shown in FIG. 2. Two color difference signals R-Y, B-Y obtained by solid-state image sensing elements such as a CCD as a color image and outputted from a matrix circuit are inputted to a quadrature phase modulation circuit 2 to obtain a modulated signal. At the same time, the two signals are inputted to an averaging and modulating circuit 3 to obtain an averaged modulated color signal.

The quadrature phase modulation circuit 2 modulates the two signals on the basis of two perpendicularly intersecting signals with a phase angle $\theta$ (i.e. Sin $\theta$, Cos $\theta$) of 3.58 MHz adopted for the NTSC converter, in order to output a modulated signal as $$\sqrt{(R-Y)^2 + (B-Y)^2} \cdot \sin(\theta + \phi_A)$$

where
$\phi_A = \tan^{-1}(R-Y)/(B-Y)$

This modulated signal A is inputted to a hue difference detecting and changing circuit 4 and a phase shifting and demodulating circuit 5. By the way, the color difference signals R-Y, B-Y inputted to the averaging and modulating circuit 3 are averaged for each picture by integrators, respectively and further phase modulated to output a modulated signal M averaged for each picture. Then, the modulated signal A and the averaged modulated signal M are both input to the hue difference detecting and changing circuit 4 to detect a hue difference signal with a voltage corresponding to a phase difference $\phi_A - \phi_M$ from the averaged modulated signal M for each modulated signal A.

Further, this color signal is outputted being multiplied by a coefficient K. And, the multiplied hu difference signal is inputted to the phase shifting and demodulating circuit 5 to obtain a signal $A(\phi_A + K(\phi_A - \phi_M))$ by shifting the phase angle $\phi_A$ of the modulated signal A, and further demodulated to output two color emphasized color difference signals (R-Y)', (B-Y)'.

Figure 3:
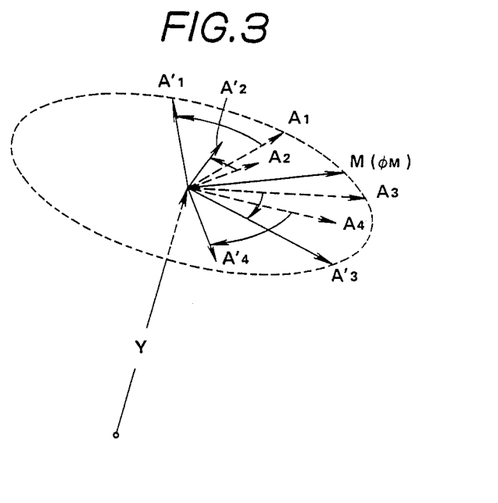
FIG. 3 is a vector diagram showing that color is emphasized by the first embodiment.

The above color difference signals thus obtained are notionally shown in FIG. 3. In more detail, if the color difference signals at a picture element are those as shown by $A_i(i=1,2,3)$ relative to the averaged color vector $M(\phi_M)$ in a picture (obtained by the circuit 3 shown in FIG. 2), the signals $A_i$ are changed into color vector $A_i'$ being rotated by the angles corresponding to phase difference $K(\phi_A - \phi_M)$ in proportion to $(\phi_A - \phi_M)$ obtained by the circuit 4, as shown by the arrows in FIG. 3. Here, the color vector $A_i'$ is obtained by rotating $A_i$ withput changing the luminance vector $Y_i$ (each $Y_i$ is shown as Y in FIG. 3 to facilitate the understanding). Further, since each vector $A_i$ is rotated from the averaged color vector M, the color tone will not be shifted from the original in a specific color direction.

The more detailed circuit configuration and operation of the above first embodiment will be described herein below with reference to FIG. 4 and after.

In an electronic scope 11 provided with the first embodiment of the color emphasis circuit, an image forming lens 13 is arranged at the end of a long and narrow insertion section 12 so formed as to be inserted into a somatic cavity. In a focused surface of this lens 13, a solid-state image sensing device 14 such as a CCD is arranged as image forming means. Light guide fibers 15 are passed through the insertion section 12 to transmit a light from an external light source device 16 to the end of the insertion section 12 so that an illumination light can be irradiated upon an object through a lens 47.

In the light source device 16, light from a light source lamp 18 is reflected from a concave mirror 19 and condensed through a condenser lens 21 at an end of a light guide cable connected to the light guide fibers. When condensed, the light is passed through a rotating filter 23 provided with three primary color transmit filters and rotated by a motor 22 so that an object can be illuminated in sequence by lights with wave lengths corresponding to three primary colors. Therefore, an object is illuminated in sequence by illumination lights of three primary colors.

Picture element signals of an optical image photoelectrically transduced by the solid-state image sensing device 14 are amplified by a low noise factor preamplifier 24 and then recorded in sequence for each frame in three (red, green, blue) frame memory units 26R, 26G, 26B via a multiplexer 25 disposed near at hand under the illumination of each of the three colors. The signals recorded in these frame memory units are read simultaneously to obtain two color difference signals R-Y, B-Y through a matrix circuit 27.

The color difference signals are inputted to the quadrature phase modulation circuit 2 and the averaging and modulating circuit 3. The color difference signals R-Y, B-Y are multiplied by Sin $\theta$, Cos $\theta$ through two multipliers 33, 34 and added by an adder 35 to output a quadrature phase modulation signal A ($\phi_A$). In this case, when a 3.58 MHz signal adopted for the NTSC converter is available as Sin $\phi$ and Cos $\phi$, it is possible to advantageously use a conventional circuit. The. output signal A ($\phi_A$) of the adder 35 becomes $\sqrt{(R-Y)^2 + (B-Y)^2}$ Sin $(\theta + \phi_A)$ as shown in FIG. 5(b) in relation to the Sin $\theta$ shown in FIG. 5(a), where the phase angle $\phi_A$ is $\tan^{-1}(R-Y)/(B-Y)$. The modulated signal M ($\phi_M$) is inputted to the phase shifting and demodulating circuit 5 via a band-pass filter 36 and directly to the hue difference detecting and changing circuit 4.

The color difference signals R-Y, B-Y input to the averaging and modulating circuit 3 are each input to two integrators 39, 40 so as to be integrated frame by frame of a color picture, and then sample-held by sample-hold circuits 41, 42 to which a strobe pulse St formed by a vertical blanking signal, for instance, for each vertical blanking period is applied. Upon completion of each sample hold, the integrators 39, 40 are reset in response to a reset signal Re.

Figure 6:
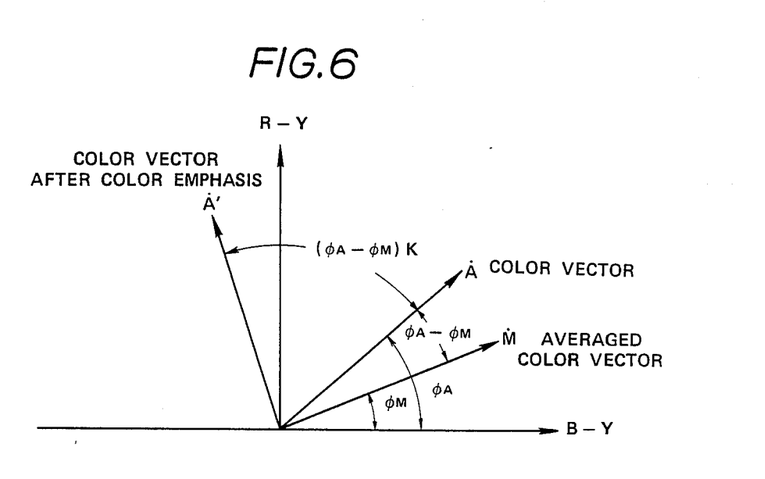
FIG. 6 is a vector diagram showing a color vector emphasized by the first embodiment.

The output signals R-Y, B-Y of the sample hold circuits 41, 42 have components representative of an averaged color M in one frame of a color picture as shown in FIG. 6 as a color vector M.

The output signals R-y, B-y of the sample hold circuits 41 and 42 are multiplied by two multiplies 43, 44, respectively and then added by an adder 45 to obtain a quadrature phase signal $M(\phi_M) = \sqrt{(R-Y)^2 + (B-Y)^2}$ Sin$(\theta + \phi_A)$, where the phase angle $\phi_M$ is $\tan^{-1}(R-Y)/(B-Y)$.

The modulated signal M($\phi_M$) is applied to an inversion input terminal of a comparator 46 of the hue difference detecting and changing circuit 4, and compared with a reference voltage adjustable by a variable resistor 47 and applied to a non-inversion terminal thereof. If the reference voltage is zero, the comparator output becomes a signal as shown in FIG. 5(d). The leading edge position of the output signal of this comparator 46 is $\phi_M-180°$ in time (phase). However, the above leading edge time position $\phi_M-180°$ is adjustable within ±90° by changing the reference level with the variable resister 47.

The output signal of the comparator 46 is applied to a set terminal of a flip-flop circuit 48 to change the output of the flip-flop to a high level in response to the leading edge of the output signal.

On the other hand, the output of the adder 35 is inputted to a comparator 49. The output of this comparator 49 is a pulse as shown in FIG. 5(e), and the leading edge position is $\phi_A$. The output pulse of this comparator 49 is applied to a reset terminal of the flip-flop circuit 48 to reset the output of the flip-flop 48 in response to the leading edge of this output pulse. Therefore, the output of the flip-flop circuit 48 has a waveform as shown in FIG. 5(f). The pulse width of this waveform corresponds to $\phi_A-(\phi_M-180°)$.

Figure 7:
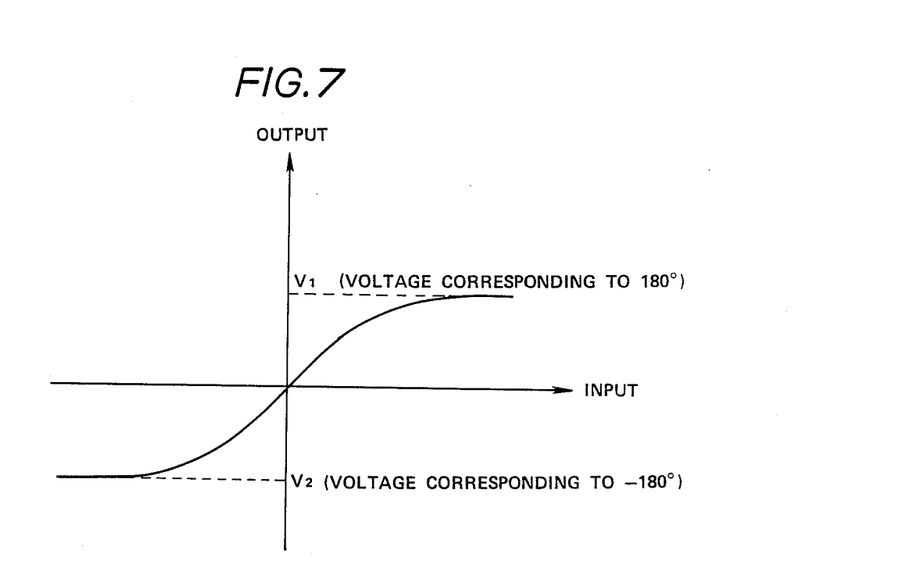
FIG. 7 is a graph showing the characteristics of a function transformer.

The output of the flip-flop circuit 48 is inputted to a slice circuit 51 so as to be sliced at a constant amplitude, and then converted into a voltage signal having a pulse width proportional to $\phi_A-(\phi_M-180°)$ by a low-pass filter 52. The reason why the output is sliced by the slice circuit 51 so as to have a constant amplitude is that the slice circuit can simply be formed by a differential amplifier and further a stable circuit can be obtained against temperature. Since $\phi_A-(\phi_M-180°)$ is $\phi_A-\phi_M+180°$, a dc voltage corresponding to 180° is subtracted from the output of the low-pass filter 52 by a subtracter 53 to obtain a voltage corresponding to $\phi_A-\phi_M$. Here, in this voltage, the expression of ±180° corresponds to a positive and negative (±) voltage. The output of the subtracter 53 is inputted to a multiplier 54, and multiplied by a dc voltage K representative of a magnitude of the color contrast value. This value K is adjustable by a variable register 55. After multiplication, the output of the multiplier 54 is inputted to a function transformer 56 to effect a transformation as shown FIG. 7. This function transformer 56 serves to limit the value $(\phi_A-\phi_M)K$ so as not to exceed ±180° and to compress the value so as not give an unnatural feeling in color on the picture when limited. That is, when the input voltage reaches a voltage corresponding to ±180°, since the change in the output level becomes small, the output voltage is limited so as not to depart from a range between $V_1$ corresponding to +180° and $V_2$ corresponding to −180°.

The above function expression is mainly determined on the basis of experience. The output of this function transformer 56 is converted into a digital signal by an A/D converter 57, and then inputted to two multiplexers 61 and 62, respectively. The lower half of the less significant bits 63 of the output of the converter 57 are inputted to the multiplexer 61, and the upper half of the more significant bits 64 are input to the multiplexer 62. Since the input of the multiplexer 61 is connected to each tap of a subdelay line 65, it is possible to select the subdelay quantity on the basis of the less significant bits 23 of the A/D converter 57. In the same way, since the input of the multiplexer 62 is connected to each tap of a main delay line 66, it is possible to select the main delay quantity on the basis of the more significant bits 64 of the A/D converter 57. The total delay quantity of the subdelay line is set to a delay quantity the same as that corresponding to one tap of the main delay line, and the output of the multiplexer 61 is connected to the input of the main delay line 66.

Figure 8:
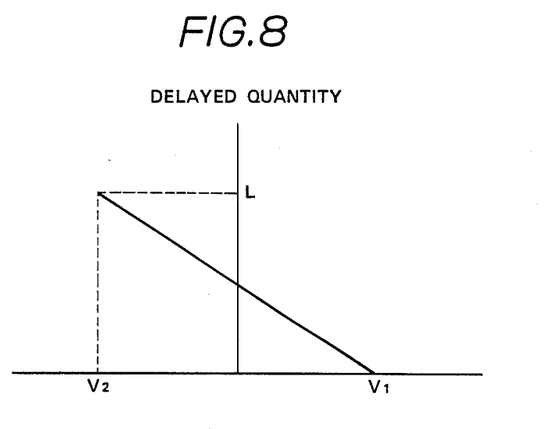
FIG. 8 is a graph showing a delayed quantity determined by the output of an A/D converter.

That is to say, if the tap outputs of the subdelay line 63 and the main delay line 66 are both 8, it is possible to select a delay quantity of 8×8=64 kinds. The selected delay quantity changes as shown in FIG. 8, in which the delay quantity is 0 when the output of the A/D converter 57 is $V_1$ (corresponding to $\phi_A-\phi_M=180°$) and L corresponding to a period of sin $\theta$ when the output thereof is $V_2$ (corresponding to $\phi_A-\phi_M=-180°$).

The quadrature phase modulated signal outputted from the adder 35 includes superfluous high frequencies when multiplied, because the Sin $\theta$, Cos $\theta$ are square in shape when quadrature phase modulated because of the reason of signal generation. Therefore, the adder output is inputted to the subdelay line 65 via a bandpass filter 36 for cutting off the high frequency spectrum to select a predetermined delay quantity by the multiplexer 61, and also inputted to the main delay line 66 to select a predetermined delay quantity by the multiplexer 62. Therefore, sample hold pulses corresponding to times that the phase angles $\theta$ of the signal used for modulation are 0° and 90° are applied to the sample hold circuits 68, 69. Since the sample hold is effected by the pulses of these angles, th amplitude is determined at the positions $(\phi_A-\phi_M)K+\phi_A$ and $(\phi_A-\phi_M)K+\phi_A+90°$ in the output signal $\sqrt{(R-Y)^2+(B-Y)^2}$ Sin $(\theta+\phi_A)$ of the adder 35. As a result, signals (R−Y)′, (B−Y)′ emphasized in color contrast at each element can be outputted. Further, the low-pass filters 71, 72 are used for smoothing the sample-held waveforms.

The emphasized color difference signals (B-Y)′, (R-Y)′ output from the output terminals 73, 74 via the low-pass filters 71, 72 correspond to those obtained by rotating the non-emphasized color difference signals (R-Y)′, (B-Y)′ as shown in FIG. 6. In other words, when the color vector of a picture element forming an image is expressed as A in relation to the averaged color vector M on a picture, the color vector A′ can be obtained by rotating the color vector A by an angle difference $(\phi_A-\phi_M)K$ where $(\phi_A-\phi_M)$ denotes a difference in angle between A and M. Further, the color difference signals (R-Y)′ and (B-Y)′ after color emphasis are converted into three primary color signals via video processor, and then displayed in color on a color monitor.

In the electronic scope 11 provided with the first embodiment of the color emphasis means, even if the color offset contrast from the averaged color is small in each picture element signal which form a picture, since the contrast can be increased without changing the luminance, it is possible to display an abnormal position in the initial disease stage, which is delicately different from the normal position, in a distinguishable color contrast on a picture obtained by the color emphasis circuit, thus allowing a correct diagnosis. Further, in this case, since the picture is not emphasized in a specific color as in the conventional color correcting circuit, the averaged color tone is not biased and also the luminance is not changed, thus allowing the best use of the experience of the diagnostician.

Figure 9:
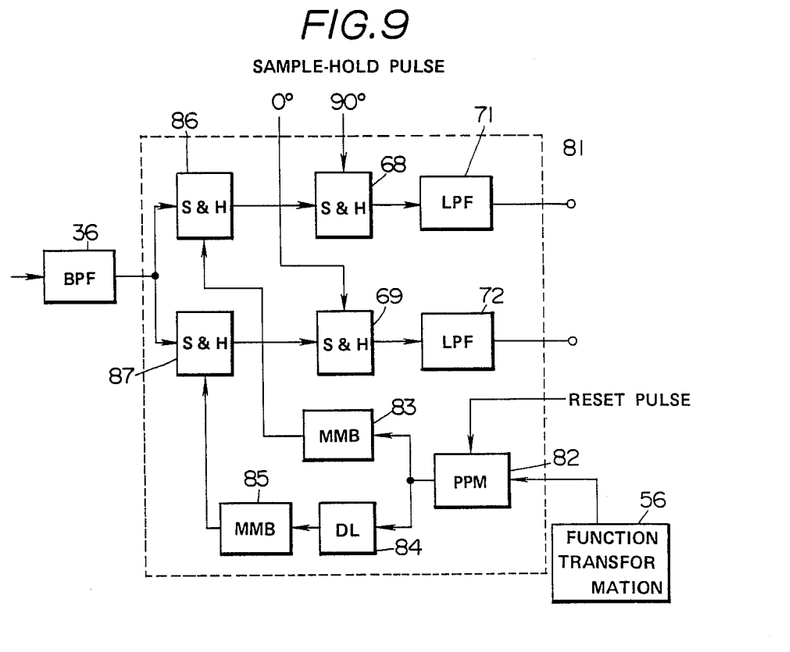
FIG. 9 is a block diagram showing the essential section of a second embodiment of the present invention.

FIG. 9 shows a second embodiment of the phase shifting and demodulating circuit according to the present invention.

Figure 4:
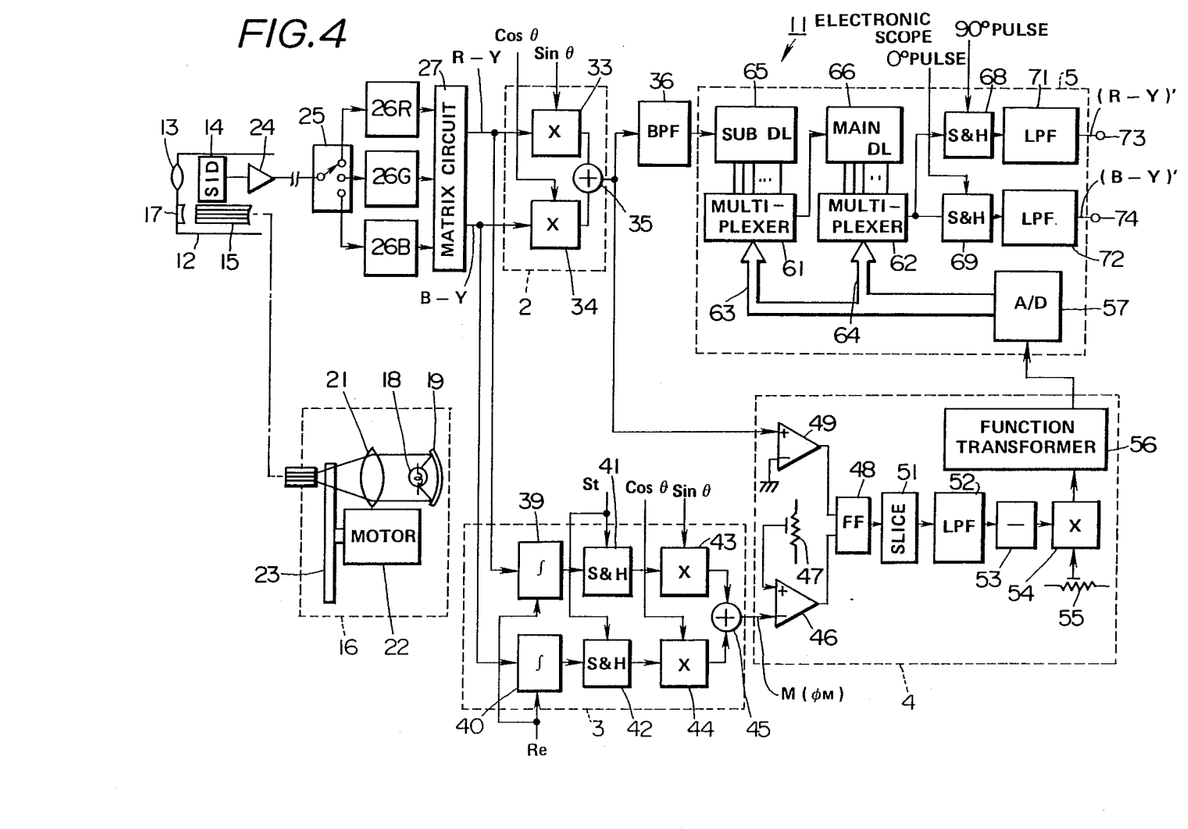
FIG. 4 is a block diagram showing a detailed circuit configuration of the first embodiment.
Figure 5:
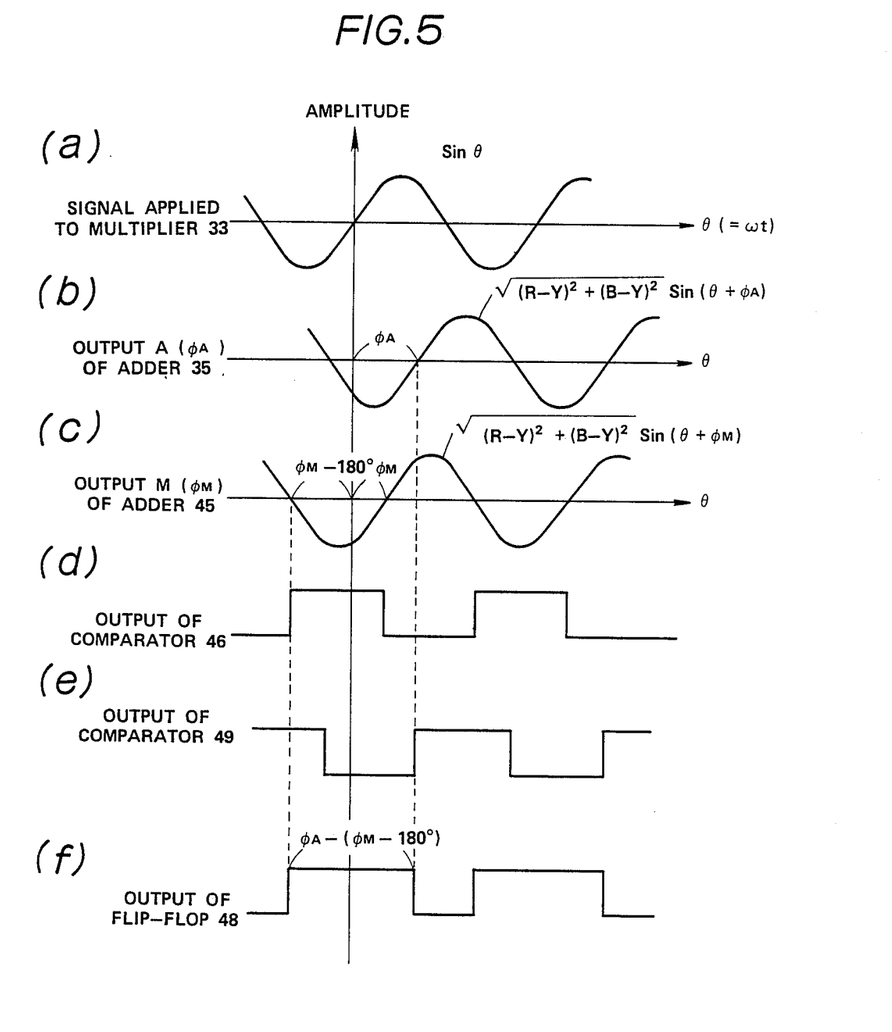
FIG. 5 is a timing chart showing waveforms at various points shown in FIG. 4.

In the phase shifting and demodulating circuit 81 of this embodiment, the output of the function transformer 56 shown in FIG. 4 is inputted to a pulse position modulator 82 to output a pulse whose pulse width is proportional to the input voltage. The output of this pulse position modulator 82 is input to a monostable multivibrator 83 and thereby converted into a narrow strobe pulse for sample holding. Further, the output of the pulse position modulator 82 is inputted to a delay line 84 to allow the output to be delayed by 90° in phase angle and then applied to a monostable multivibrator 85 to output another narrow strobe pulse having a phase 90° shifted from the output of the multivibrator 83. These two pulses are input to two sample hold circuits 86, 87, respectively to sample hold an output of a bandpass filter 36. The outputs of the above sample hold circuits 86, 87 are input to the other sample hold circuits 68, 69 to obtain a constant sample period (the second sample holding operation), and then applied to low-pass filter 71, 72, respectively. Further, the above pulse position modulator 82 is reset in response to a reset pulse at an angular position of 0°. The feature of this second embodiment is to realize the same function as in first embodiment without use of delay lines or an A/D converter.

Figure 10:
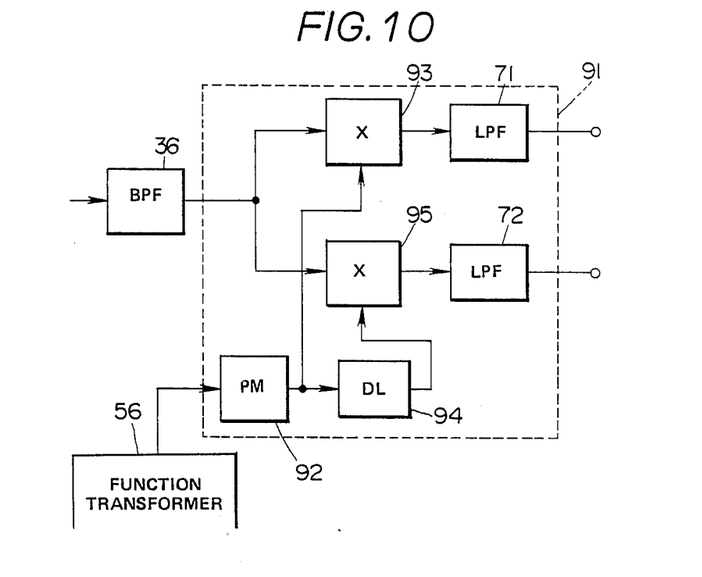
FIG. 10 is a block diagram showing the essential section of a third embodiment of the present invention.

FIG. 10 shows a third embodiment of the phase shifting and demodulating circuit.

In the phase shifting and demodulating circuit 91 of this embodiment, the output of the function transformer 56 shown in FIG. 4 is inputted to a phase modulator 92. The phase modulated output is divided into two. One output is input to a multiplier 95 via a delay line 94 being delayed by 90°. That is, the modulated signal inputted via the bandpass filter 36 is phase detected by the multipliers 93, 95. These phase shifted signals are outputted through low-pass filters 71, 72 for passing low frequency signal components as signals (R-Y)', (B-Y)' color-emphasized for each picture element.

Figure 11:
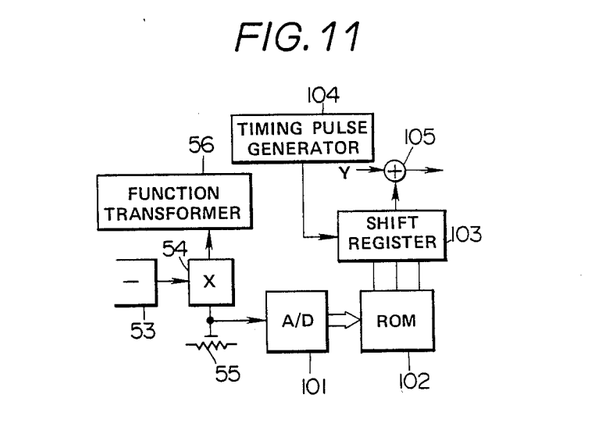
FIG. 11 is a block diagram showing the essential section of a fourth embodiment of the present invention.

FIG. 11 shows the essential section of the fourth embodiment of the present invention. In this embodiment, the multiplication coefficient K of the multiplier 54 for determining the magnitude of color emphasis shown in FIG. 4 can be displayed at a corner of a monitor picture, so that it is possible to know the magnitude of color emphasis whenever a picture is reproduced later.

For instance, an output voltage V of the variable resistor 55 for determining a multiplication coefficient K is converted into a digital value through an A/D converter 101; a displayed numeral value K is written in a ROM 102 with the converted digital value as an address; a read data is fetched to a shift register 103 and then outputted by a display timing pulse generator 104. This output is added to a luminance signal Y by an adder 105 so as to be displayed at a corner of a color-emphasized picture on a display monitor (not shown).

According to this fourth embodiment, since it is possible to know the magnitude of color emphasis, this is convenient when a recorded picture is reproduced again for diagnosis or the picture is diagnosed by another diagnostician. Further, the color emphasis coefficient K can be displayed in blue or another color or by adding it to either of the emphasized color difference signals (R-Y)', (B-Y)'.

In the above embodiments, color is assumed to be emphasized for each picture element unit. However, without being limited thereto, it is possible to emphasize color for every plural picture element. Further, the averaged hue on a picture is obtained by integrating all the signals for a picture. However, without being limited thereto, it is also possible to obtain the averaged hue by extracting a value representative of several picture elements and integrating these extracted values or by adding the extracted values and dividing the added value by an added total number.

Further, the color emphasis is effected in proportion to color offset values from an averaged hue by the function transformer 56. However, it is also possible to effect the color emphasis non-linearly. Further, the characteristics of non-linear color emphasizing means can be determined so as to be adjustable. Further, when the color is emphasized non-linearly, the color can be emphasized at a hue position offset from the averaged hue by increasing the color emphasis coefficient. In this case, it is desirable to emphasize color symmetrically with respect to the averaged value so that color is not biased from the averaged value.

Further, in the above embodiments, an object is illuminated by changing three primary colors in sequence. However, the present invention can be applied to a color video system using solid-state image sensing elements under white color illumination.

Further, without being limited to an analog color emphasis system, the present invention is applicable to a digital color emphasis system, although the digital system is disadvantageous from the standpoints of quantization error and circuit configuration scale because non-linear processings are required.

Furthermore, the present invention can be applied to various instruments without being limited to only the electronic scope.

As described above, according to the present invention, since the color dynamic range can be increased by shifting the phase angles of color signals having hue near an averaged color, it is possible to distinguish a normal part from a diseased part even if a difference in hue between the two is small, thus providing an effective diagnosis. In addition, since the color can be effected without changing the picture luminance and/or the averaged hue, it is possible to make the best use of the past diagnosis experience of the diagnostician.

As many apparently different embodiments of this invention may be made without departing from the spirit and scope thereof, it is to be understood that the invention is not limited to the specific embodiments thereof except as defined in the appended claims.

What is claimed is:

1. A color emphasis circuit comprising;
   color signal modulating means for modulating color signals corresponding to a color image;
   color signal averaging means for obtaining an averaged value by averaging the color signals for every color image;
   averaged color signal modulating means for modulating the averaged color signals;
   hue difference detecting means for detecting a hue difference between the modulated color signal output from said color signal modulating means and the modulated averaged color signal output from said averaged color signal modulating means;
   hue difference changing means for widening the detected hue difference at least near the averaged value so as to change the hue difference;
   phase shifting means for shifting phases of the modulated color signals by the changed hue difference; and
   demodulating means for demodulating the phase shifted modulated color signals to output color emphasized color signals.

2. The circuit as set forth in claim 1, wherein said modulating means comprises:
   two multipliers for multiplying two perpendicularly intersecting color signals by a sine wave and a cosine wave, respectively; and
   an adder for adding said two multiplied signals.

3. The circuit as set forth in claim 1, wherein said color signal averaging means comprises:
   two integrating circuits for integrating and averaging two perpendicularly intersecting color signals for each frame period; and
   two sample and hold circuits for sampling the outputs of said two integrating circuits, respectively and for holding the outputs for each frame period.

4. The circuit as set forth in claim I, wherein said hue difference detecting means comprises:
   two comparators each having a first input terminal for receiving the modulated color signal and the modulated averaged color signal respectively, and a second input terminal for receiving two reference voltages different from each other, respectively;
   a flip-flop having a set terminal and a reset terminal for receiving the outputs of said two comparators, respectively to output a pulse with a pulse width corresponding to a phase difference between the plural modulated signals;
   a slice circuit for slicing the pulse output from said flip-flop at a constant amplitude;
   a subtractor for subtracting a constant value from said sliced pulse passed through said circuit to obtain a pulse with a width proportional to the phase difference between the plural modulated signals;
   a multiplier for multiplying the pulse of said subtractor by a phase difference widening coefficient K having a value more than 1; and
   a function transformer for restricting an output of said multiplier so as not to exceed a predetermined value.

5. The circuit as set forth in claim 1, wherein said phase shifting means comprises;
   an A/D converter for A/D converting the hue difference signal outputted from said phase difference means;
   A multiplier for selecting plural output terminals in response to an output of said A/D converter; and
   a delay element having plural taps connected to the output terminal of said multiplier, for determining a delay quantity proportional to a magnitude of the converted output.

6. The circuit as set forth in claim 1, wherein said modulating means comprises:
   two sample and hold circuits for sampling two signals passed through said phase shifting means respectively, in response to two pulses outputted when the phase angle of a signal used for quadrature modulation is 0° or 90°; and
   two low-pass filters for smoothing two output signals from said two sample and hold circuits, respectively.

7. The ciruit as set forth in claim 1, wherein said phase shifting means comprises;
   a pulse position detector for receiving a phase difference signal output from said phase difference detecting means and outputtting a pulse having a width proportional to a voltage of the received signals;
   a sampling pulse forming circuit for forming a strobe pulse having a phase difference of 90° relative to a phase angle of a modulated signal used to modulate said color signal in response to an output of said pulse position detector; and
   two sample-and-hold circuit for sample holding the modulated color signals in response to two strobe pulses.

8. The circuit as set forth in claim 1, wherein said phase shifting means and demodulating means comprises:
   phase modulating circuit for phase modulating the phase difference signal outputted from said phase difference detecting means;
   two multipliers for multiplying the phase-modulated signals and a signal with a phase difference of 90° from that of the signal by the modulated color signal respectively, for phase detection; and
   two low-pass filters for passing low frequency signal components of the signals outputted form said multipliers, respectively.

9. The circuit as set forth in claim 1, which further comprises means for displaying a magnitude of hue difference widening coefficient outputted from said hue difference changing means on a display picture.

10. The circuit as set forth in claim 4, wherein the magnitude of the coefficient can be adjusted.

11. An electronic scope comprising:
    a color emphasis circuit as set forth in claim 1;
    a long and narrow insertion section of said scope;
    illuminating means for emitting an illumination light from an end of said insertion section;
    an optical image forming system for forming an image of an object illuminated by said illuminating means;

solid-state image sensing elements each having an image surface arranged in a focus surface of said optical image forming system;

color signal forming means for forming color signals on the basis of output signals from said solid-state image sensing elements;

a video processor for converting color signals passed through said color emphasis circuit into color signals for display.

12. A color emphasis circuit, comprising:

color signal mdoulating means for modulating color signals corresponding to a color image;

specific color singal modulating means for modulating specific color signals corresponding to specific hue value;

hue difference detecting means for detecting a hue difference between the modulated color signal output from said color signal modulating means and the modulated specific color signal output from said specific color signal modulating means;

hue difference changing means for widening the detected hue difference at least near the specific hue value so as to change the hue difference;

phase shifting means for shifting phases of the modulated color signals by the changed hue difference; and demodulating means for demodulating the phase shifted modulated color signals to output color emphasized color signals.

* * * * *